(12) United States Patent
Scheyer et al.

(10) Patent No.: US 8,327,552 B2
(45) Date of Patent: Dec. 11, 2012

(54) VIAL FOR A SPIRIT LEVEL

(75) Inventors: Wolfgang Scheyer, Götzis (AT); Lukas Zwing, Dornbirn (AT)

(73) Assignee: Sola-Messwerkzeuge GmbH, Gotzis (AT)

( * ) Notice: Subject to any disclaimer, the term of this patent is extended or adjusted under 35 U.S.C. 154(b) by 0 days.

(21) Appl. No.: 13/103,215

(22) Filed: May 9, 2011

(65) Prior Publication Data

US 2011/0271537 A1 Nov. 10, 2011

(30) Foreign Application Priority Data

May 10, 2010 (AT) .................................. A 785/2010

(51) Int. Cl.
 *G01C 9/26* (2006.01)
(52) U.S. Cl. .......................................... 33/348; 33/379
(58) Field of Classification Search .................... 33/348, 33/379–390
 See application file for complete search history.

(56) References Cited

U.S. PATENT DOCUMENTS

| | | | |
|---|---|---|---|
| 4,663,856 A * | 5/1987 | Hall et al. | 33/381 |
| 5,111,589 A * | 5/1992 | Tate | 33/385 |
| 6,115,928 A * | 9/2000 | Dauerer | 33/348 |
| 6,957,494 B1 | 10/2005 | Foran | |
| 2005/0155241 A1 * | 7/2005 | Scheyer | 33/379 |
| 2009/0139102 A1 * | 6/2009 | Kallabis | 33/379 |

FOREIGN PATENT DOCUMENTS

| | | |
|---|---|---|
| DE | 20 2007 000 049 | 5/2009 |
| WO | 2005/103614 | 11/2005 |
| WO | 2010/067371 | 6/2010 |

OTHER PUBLICATIONS

Austrian Patent Office Search Report issued Mar. 14, 2011 in corresponding Austrian Patent Application No. A 785/2010.
Wikipedia, Article "vial (measurement)", version of Apr. 28, 2010, requested on Mar. 14, 2011 <URL: http://de.wiikipedia.org/w/index.php?title=Libelle%28Messtechnik%29&oldid=73732695> paragraph 3.2 (circular level) [and corresponding English version http://en.wikipedia.org/wiki/Spirit_level].

* cited by examiner

*Primary Examiner* — G. Bradley Bennett
(74) *Attorney, Agent, or Firm* — Wenderoth, Lind & Ponack, L.L.P.

(57) ABSTRACT

A device includes a vial for a spirit level. The vial has at least a first and a second region, and the second region directly adjoins the first region. A marker body is provided in the vial, and the marker body in a leveled condition of the vial is disposed in the first region. One of the at least two regions is darkened and thereby the marker body is partially visible outside the leveled condition of the vial.

43 Claims, 17 Drawing Sheets

VIAL FOR A SPIRIT LEVEL

BACKGROUND OF THE INVENTION

I. Technical Field

The invention concerns a device comprising a vial, in particular a block vial, for a spirit level, the vial comprising a marker body, in particular a bubble, a first region, wherein the marker body in the leveled condition of the vial is disposed in the first region and at least one second region, wherein the second region directly adjoins the first region.

The invention further concerns a spirit level, in particular a spirit level having a profile body.

II. Description of the Related Art

Such vials are already known in large numbers in the state of the art.

Various measures have been made to try to improve the readability of the vials. Thus, WO 2005/103614 A2 (Empire Level) teaches a vial comprising two marking rings which include the first region between them. A dark band is arranged between each marking ring and the respective end of the vial for improved recognition of the marker body between the marking rings. The position of the marker body in relation to the marking rings can be more easily read off by reflection of the dark bands on the marker body.

SUMMARY OF THE INVENTION

The object of the invention is to provide a vial which is improved in comparison with the state of the art.

That object is attained by a vial having at least first and second regions, the second region directly adjoining the first region, and a marker body in the vial, the marker body in a leveled condition of the vial is disposed in the first region, one of the at least two regions is darkened and thereby the marker body is partially visible outside the leveled condition of the vial.

The fact that one of the two regions is of a darkened nature means that the viewer can more easily see whether the marker body of the vial is entirely in the first region and thus the vial is in the leveled condition.

In that respect 'darkened' is used to mean that the corresponding region is not completely transparent. That darkened region could therefore partially allow light to pass therethrough, equally it could also be opaque. In addition it could also be envisaged that the darkening is not over the full surface area but that a multiplicity of individual colored dots are arranged and thus impede a view on to the interior of the vial in that region.

The viewer is caused by the darkened region—strictly speaking even obliged—to accurately level off the vial in order to ensure that the marker body is disposed entirely in the first region. Thus the reading accuracy can be increased as the viewer will also immediately see if there is a parallax reading error and can react immediately thereto. In comparison with the state of the art it is a completely novel concept to use at least one region that is darkened with respect to another region of the vial as in the state of the art the important consideration was always improving the recognition of the marker body relative to the marking rings. In the invention marking rings are no longer even required although the arrangement of marking rings which in themselves are unnecessary should not be a departure from the scope of protection.

Further advantageous configurations of the invention are set forth herein.

In a preferred embodiment it can be provided that the second region is of a width which corresponds at least to a quarter—in particular a third—of the width of the first region.

It has proven to be particularly advantageous if the darkened region is translucent—partially light-transmissive—, and thus the marker body can also still be seen when it is in the darkened region. Naturally the darkened region however can also be opaque.

In a preferred embodiment it can be provided that the second region substantially completely surrounds the first region, and thus it is possible to achieve advantageous reading in all positions of inclination of the vial.

It can further preferably be provided that the vial has a third region, wherein the third region directly adjoins the first region and is of a width which corresponds at least to a quarter—in particular a third—of the width of the first region. Thus preferred reading of the vial can take place at both sides of the first region of the vial—if it for example is in the form of a tube-type or block vial.

It is not excluded by the invention for the vial to have at least one marking ring—preferably two marking rings. The degree of reading accuracy can possibly be increased by the use of marking rings. They are however in no way necessary for the invention. Particularly preferably it is even provided that the vial is free of marking rings.

It can particularly preferably be provided that the second region is in the form of a darkened region or the second and third regions are in the form of a darkened region. Thus the marker body is clearly visible in the leveled condition of the vial both in the case of circular vials and also in the case of block and tube-type vials.

It has proven to be particularly advantageous in that respect if the darkened region is provided at least partially—preferably substantially completely—at the surface of the body, that is towards the cavity.

In a preferred embodiment it can be provided that the darkened region is provided at least partially—preferably substantially completely—in the interior of the body.

It has further proven advantageous if the darkened region is provided at least partially—preferably substantially completely—at the outside surface of the body.

It has been found advantageous if the second region extends substantially to the end of the cavity or the second and the third regions extend substantially to the end of the cavity.

It can further be preferably provided that the second region extends substantially to the end of the body or the second and the third regions extend substantially to the end of the body.

In a possible embodiment it can be provided that the darkened region is formed at least partially—preferably substantially completely—from a coloring coating material—preferably ink, lacquer, plastic material, metal or a metal alloy.

In a preferred embodiment it can be provided that the darkened region has at least two different color regions.

Desirably the two color regions are in the form of mutually superposed color layers at the surface of the body, that is towards the cavity, wherein one color layer is in the form of an inner layer and one color layer is in the form of an outer layer.

Protection is also claimed for a spirit level, in particular a spirit level having a profile body, with at least one vial according to at least one of the above-described embodiments.

BRIEF DESCRIPTION OF THE DRAWINGS

Further details and advantages of the invention are described more fully hereinafter by means of the specific description with reference to the embodiments illustrated in the drawing in which.

DETAILED DESCRIPTION OF THE INVENTION

In the following specific embodiments the marker body 4 is in the form of a bubble. Equally the marker body 4 could also be in the form of a solid body or a further liquid. To provide a term for the marker body 4, which is practical for the man skilled in the art, it is referred to in the specific description as the bubble. That is not to be viewed as a limitation.

Figure 1:
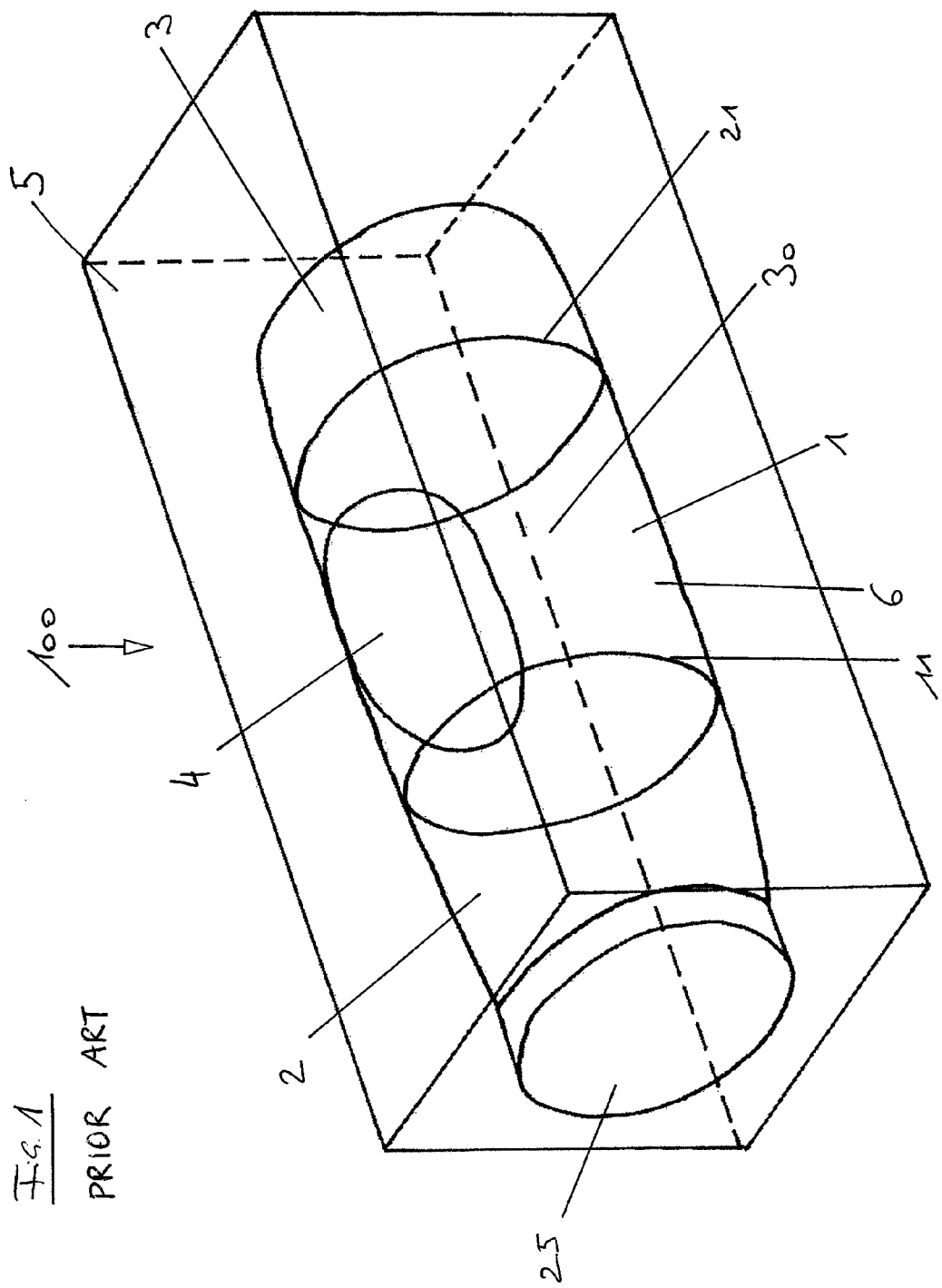
FIG. 1 shows a perspective view of a block vial in accordance with the state of the art.

FIG. 1 shows a vial 100—in this case a block vial—in accordance with the state of the art. That block vial 100 has a body 5. A cavity 6 is provided in the body 5. The liquid 30 is disposed in that cavity 6. The cavity 6 however is not completely filled by the liquid 30 but the bubble 4 remains in the cavity 6. The cavity 6 is closed with the closure cover 25. The vial 100 is in the leveled condition when the bubble 4 is in the middle region 1 and it is in the non-leveled condition when the bubble 4 is in the regions 2 or 3—even if only at least partially. In the state of the art, to establish the leveled condition, it is absolutely necessary for the vial 100 to have marking rings 11 and 21.

Figure 2:
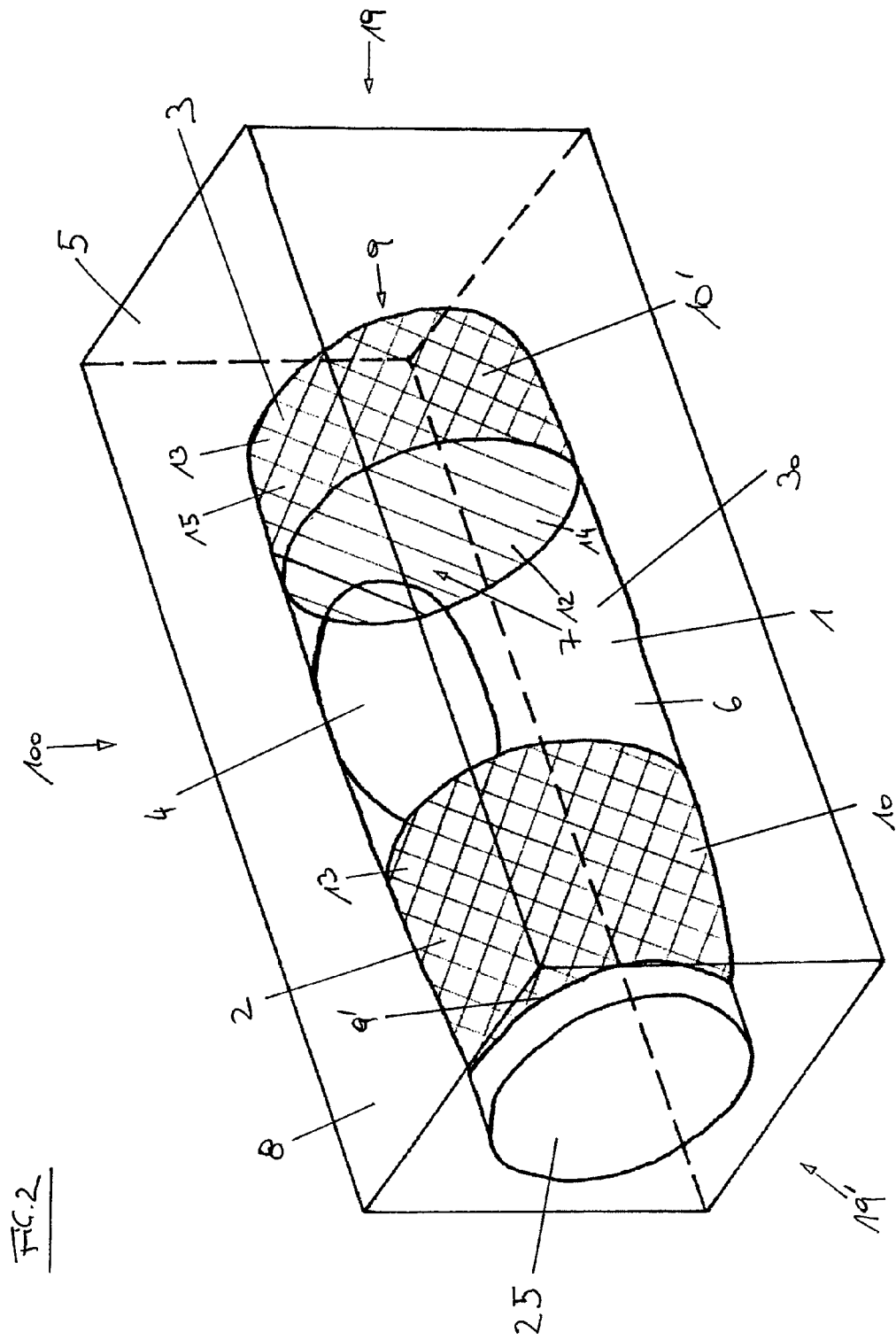
FIG. 2 shows a perspective view of a block vial having two darkened regions.

FIG. 2 shows a block vial 100 having a body 5 and a cavity 6 in the body 5. Once again disposed in the cavity 6 is the liquid 30 which does not completely fill the cavity 6 but the bubble 4 remains therein. The cavity 6 is again closed by the closure cover 25.

In this embodiment the regions 2 and 3 have darkened regions 10 and 10' (or darkenings 10, 10'). By virtue of those darkened regions 10 and 10' at the second region 2 and the third region 3, it is now possible to see when the bubble 4 is not in the first region and thus the vial 100 is in a non-leveled condition as the bubble 4 is then partially (or not at all) clearly visible. No marking rings are provided.

In this case the darkened regions 10 and 10' are of a partially translucent nature, which provides that, when the bubble 4 is at least partially in the darkened regions 10 or 10', it is still visible—even if it is only indicated. Both the second region 2 and the third region 3 directly adjoin the first region 1 and are of a width corresponding to at least a quarter—in particular a third—of the width of the first region. Both the second region 2 and the third region 3 in this preferred embodiment are in the form of darkened regions 10 and 10'. It will be appreciated that it would also be conceivable for all three regions 1, 2 and 3 to be darkened. Thus, for example the regions 2 and 3 could be darkened differently from the region 1, as for example by selecting one color for the regions 2 and 3 and a further color for the region 1.

In this case the darkened regions 10 and 10' are at least partially—preferably substantially completely—provided at the surface 7 of the body 5, that is towards the cavity 6. The darkened regions 10 and 10' could also be disposed in the interior of the body 5. It will be appreciated that equally they could also be provided at the outside surface 8 of the body 5.

In this embodiment the darkened regions 10 and 10' extend substantially to the ends 9 and 9' of the cavity 6. It will be appreciated that the darkened regions 10 and 10' could equally extend substantially to the end 19 and 19' of the body 5 if they were provided in the interior of or at the outside surface 8 of the body. In addition it would also be possible for the darkened regions 10 and 10' to be only in the form of strips, adjoining the adjacent region 1. In practice it has been found that the positive read-off effect can already occur as from a strip width in respect of the darkened regions 10 and 10' of about 2 mm, but greater widths are preferred. It has been found with a block vial 100 having a first region 1 of about 13 mm that darkened regions 10 and 10' of a width as from about 3 mm can be pleasantly read off. Vials 100 with wider darkened regions 10 and 10', such as for example of a width of 5 mm, can however be even better read off.

In this preferred embodiment the darkened regions 10 and 10' are made from a coloring coating substance—here more specifically ink. It will be appreciated that other chemical products such as for example lacquer would also be suitable for use. It will be appreciated that any other way of producing a darkened region 10 or 10' could also be envisaged, such as for example by applying a steel insert or by glueing in labels or the like. It would equally be possible to provide embossed bands or plastic inserts, it would further also be possible for example plastic material to be injected or for the dark regions 10 and 10' to be produced by insert molding.

A simple method would also be that of fitting a sleeve or cap, preferably two sleeves or caps, over the regions 2 and 3 of the vial 100 in order thereby to produce darkened regions 10, 10'.

It is also possible to consider applying a film or a textile web structure as a possible way of producing darkened regions 10 and 10'.

In this embodiment the darkened regions 10 and 10' have two different color regions 12 and 13. That makes it possible for the viewer to more easily detect a parallax read-off error as an inner color layer 14 is visible only when the viewer is not perpendicularly viewing the vial 100. In this case the two color regions 12 and 13 are in the form of mutually superposed color layers 14 and 15 on the surface 7 of the body 5, that is towards the cavity 6, wherein—as already mentioned—the color layer 14 is in the form of the inner layer and the color layer 15 is in the form of the outer layer.

In a further embodiment it can be provided that at least one of the parts is at least partially fluorescent or phosphorescent, such as for example:
- the body 5 of the vial 100,
- the closure cover 25 of the cavity 6,
- the liquid 30 in the cavity 6 in the body 5, and
- the marker body 4.

In detail those at least partially fluorescent or phosphorescent parts could be:
- the first region 1,
- the second region 2,
- the third region 3,
- the marker body 4,
- the surface 7 of the body 5, that is towards the cavity 6,
- at least one marking ring 11, 21,
- at least one color region 12, 13, and
- the outside surface 8 of the body 5.

Figure 3:
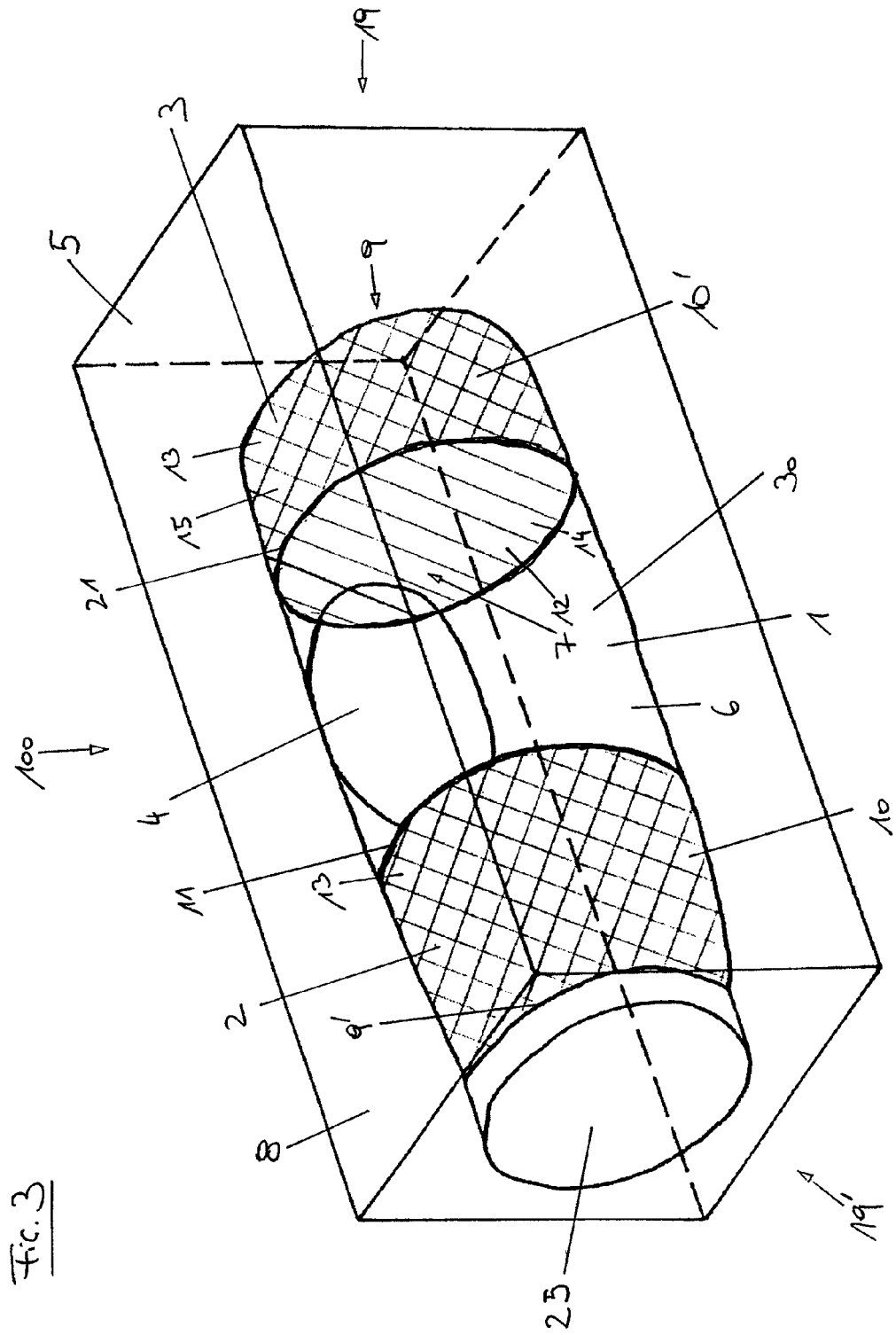
FIG. 3 shows a perspective view of a block vial having two darkened regions and two marking rings.

FIG. 3 shows a block vial 100 as just described with reference to FIG. 2, with the sole difference that it further has two marking rings 11 and 21. Otherwise all which has been mentioned in relation to the description of FIG. 2 correspondingly applies.

Figure 4:
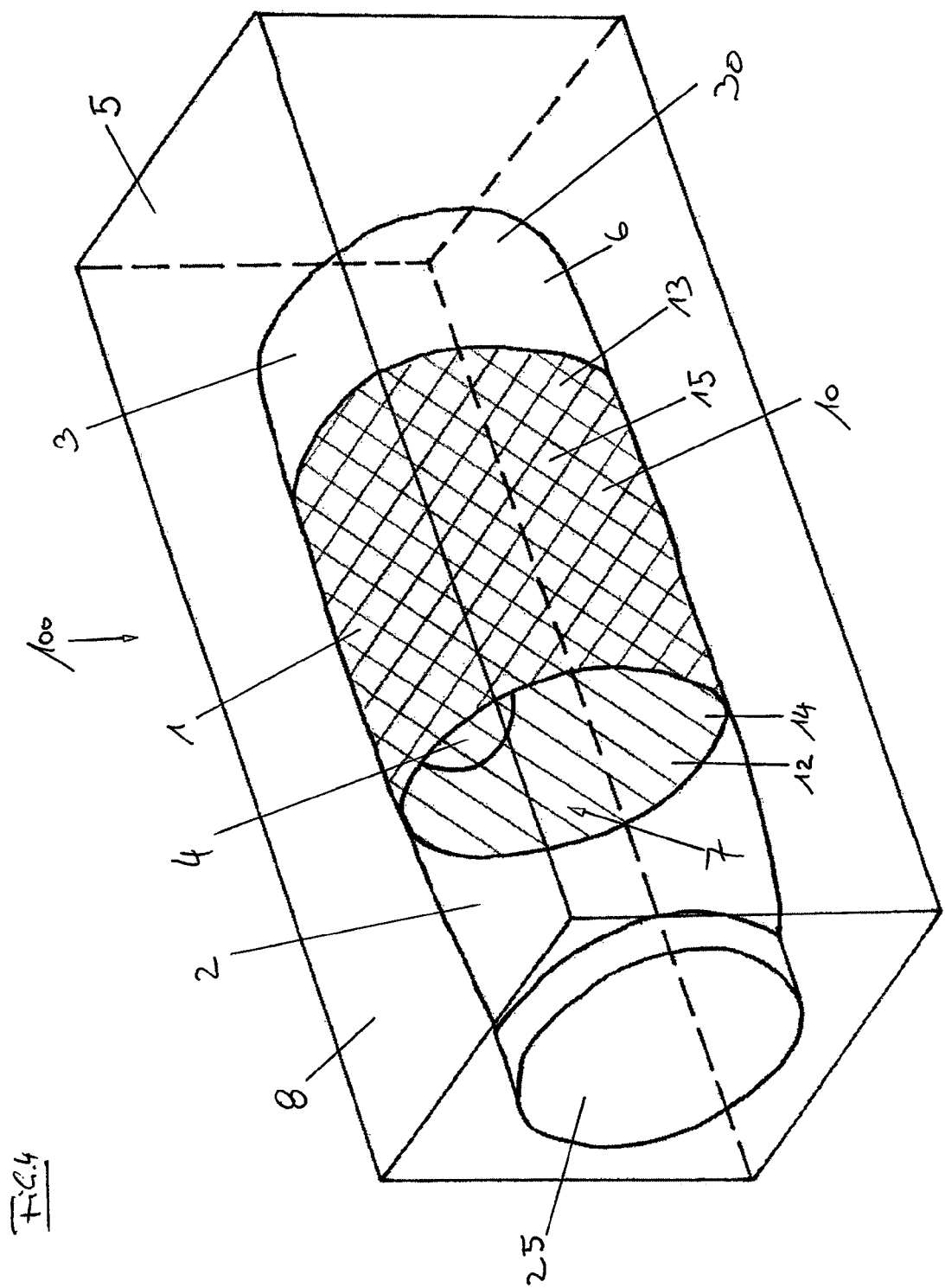
FIG. 4 shows a perspective view of a block vial having a darkened region

FIG. 4 shows a block vial 100 having a bubble 4 and a first region 1, wherein in the leveled condition of the vial 100 the bubble 4 is in the first region 1, and a second region 2, wherein the second region 2 directly adjoins the first region 1 and is of a width corresponding at least to a quarter—in particular a third—of the width of the first region 1, the first region 1 being darkened at 10 in this embodiment.

Such a configuration therefore provides that the bubble 4 is clearly visible to the viewer only when the vial 100 is in the non-leveled condition and the ends of the bubble 4 extend into the second region 2 or the third region 3.

In the leveled condition of that vial 100 therefore the bubble 4 cannot be seen or can be only limitedly seen. It will be appreciated that everything which was also mentioned in relation to the description relating to FIG. 2 also applies regarding the configuration of the darkened region in terms of transparency, different color regions and material and the like.

In this embodiment the vial 100 does not have any marking rings but it will be appreciated that it would also be possible for marking rings to be also arranged here between the first region 1, and the second region 2 and third region 3 respectively.

Figure 5:
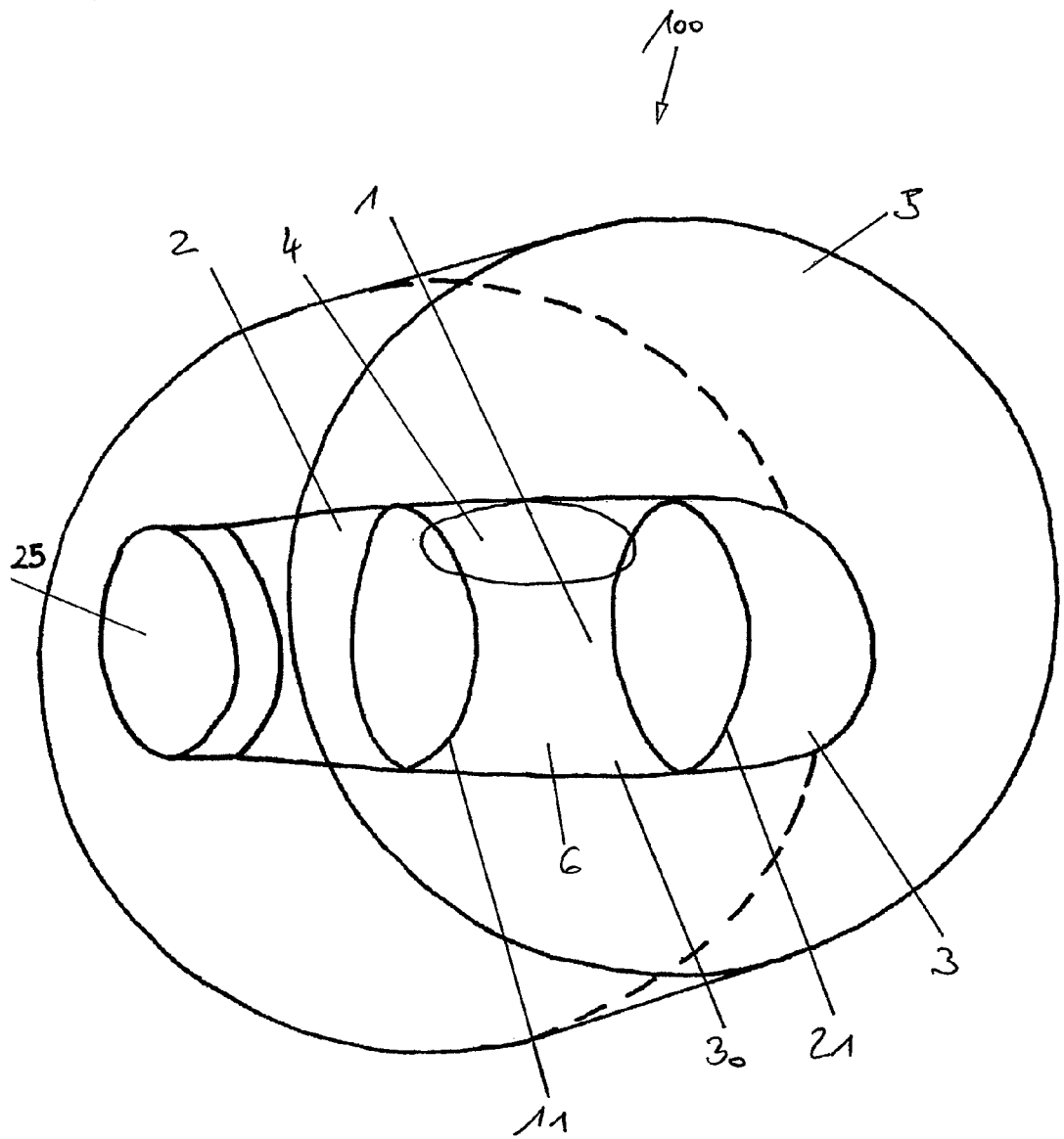
FIG. 5 shows a perspective view of a block vial for vertical measurement in accordance with the state of the art.

FIG. 5 shows a block vial 100 in accordance with the state of the art, wherein that block vial 100 is intended for measurement of the vertical with a spirit level 110 (not shown), in contrast to the vial 100 shown in FIG. 1, which is intended for measurement of the horizontal, with the spirit level 110 which is also not shown there.

Otherwise the description relating to FIG. 1 also applies.

Figure 6:
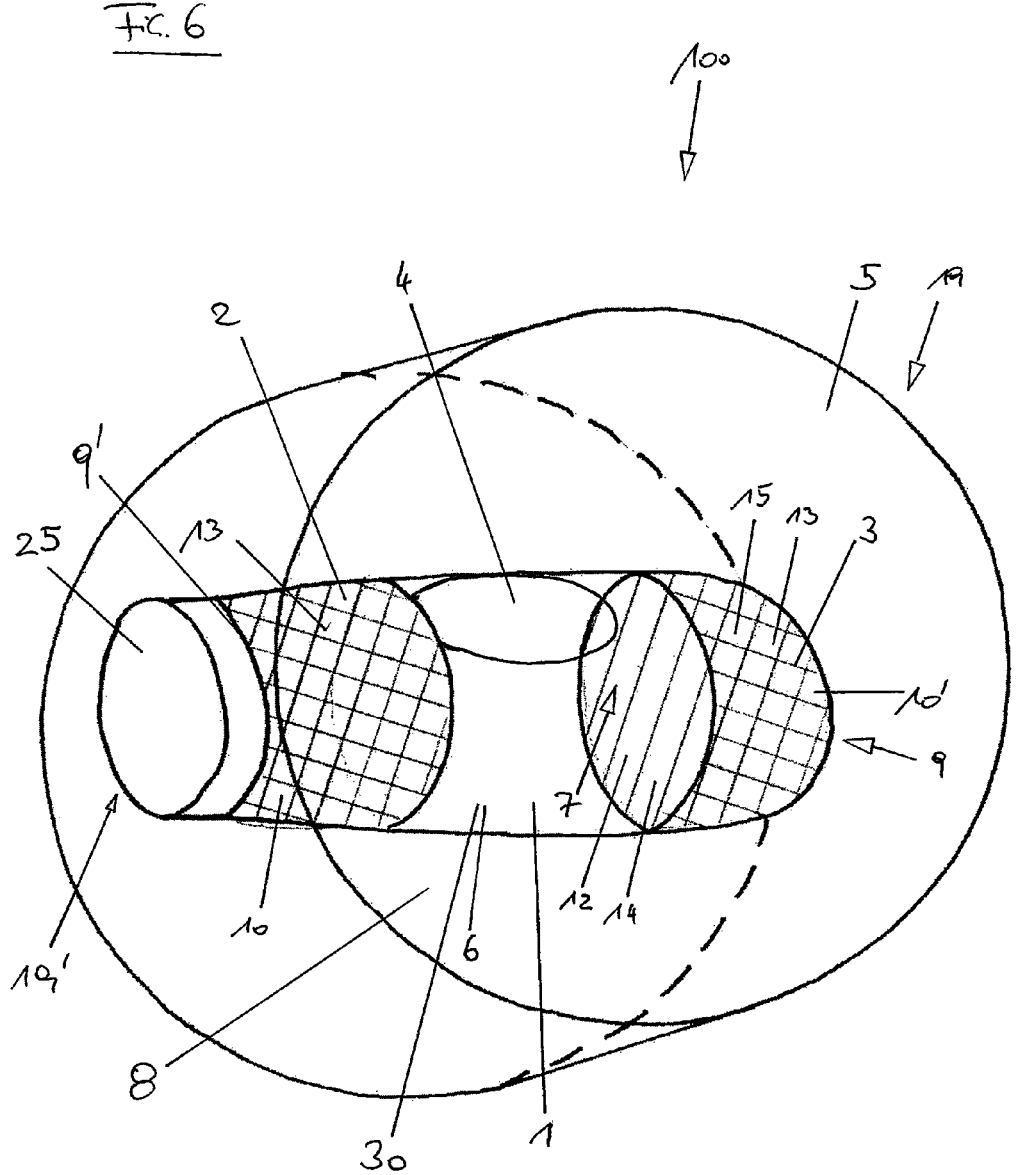
FIG. 6 shows a perspective view of a block vial for vertical measurement having two darkened regions.

FIG. 6 shows a block vial 100 for use in a spirit level 110 (not shown) for measuring the vertical orientation.

The description relating to FIG. 2 also applies to this vial 100.

The vial 100 shown here does not have any marking rings, it will be appreciated that it would also be possible for that vial 100 to be provided with marking rings.

The darkened region 10 could also be disposed in the first region 1—as mentioned in FIG. 4—and not in the second region 2 and in the third region 3, as shown in this FIG. 6.

Figure 7:
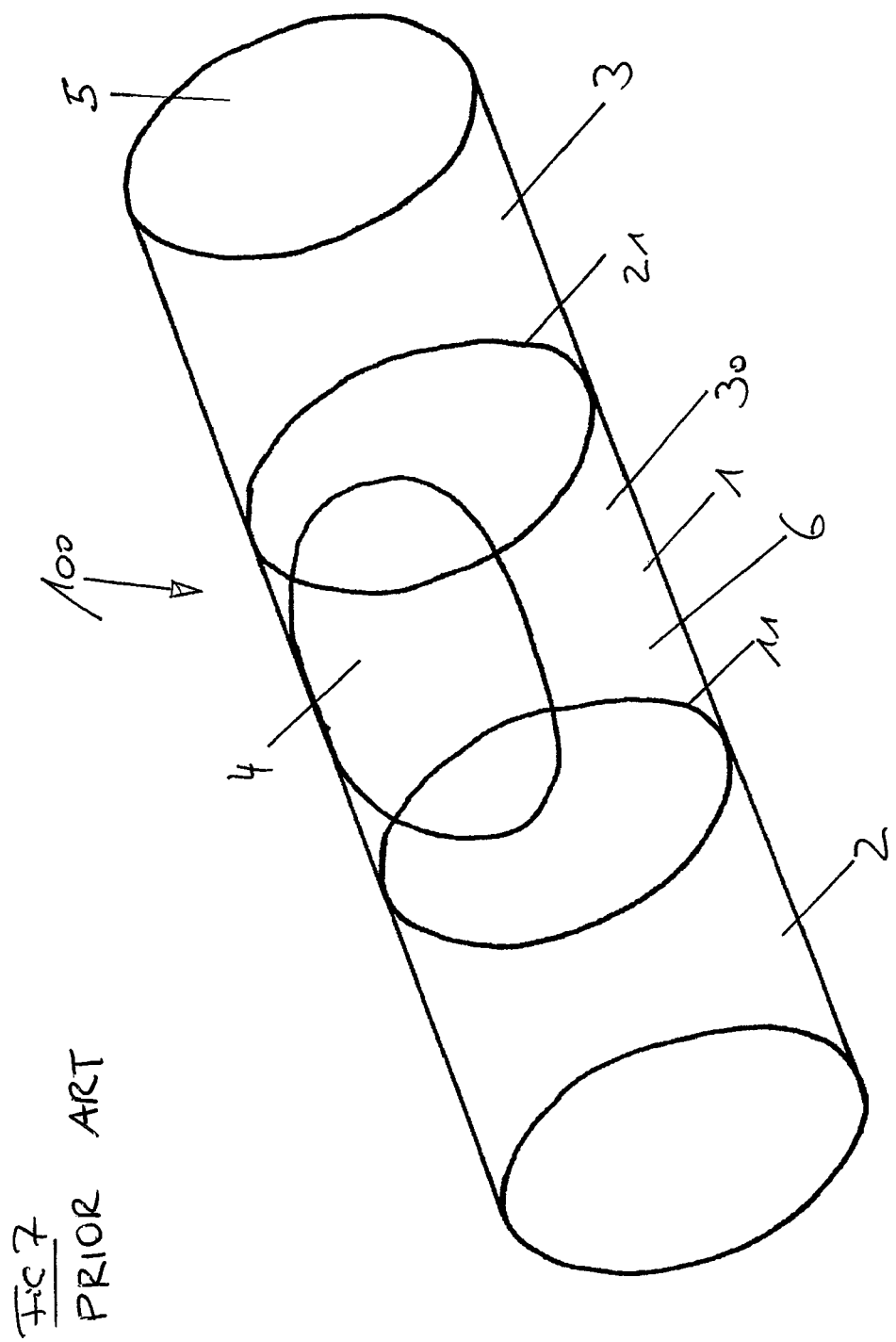
FIG. 7 shows a perspective view of a tube-type vial in accordance with the state of the art.

FIG. 7 shows a perspective view of a tube-type vial in accordance with the state of the art. This has a body 5 of a somewhat different configuration from the block vial 100 shown in FIG. 1. Otherwise, the same description as set forth in relation to the block vial 100 in FIG. 1 also applies in substance in regard to the tube-type vial 100 shown in FIG. 7.

Figure 8:
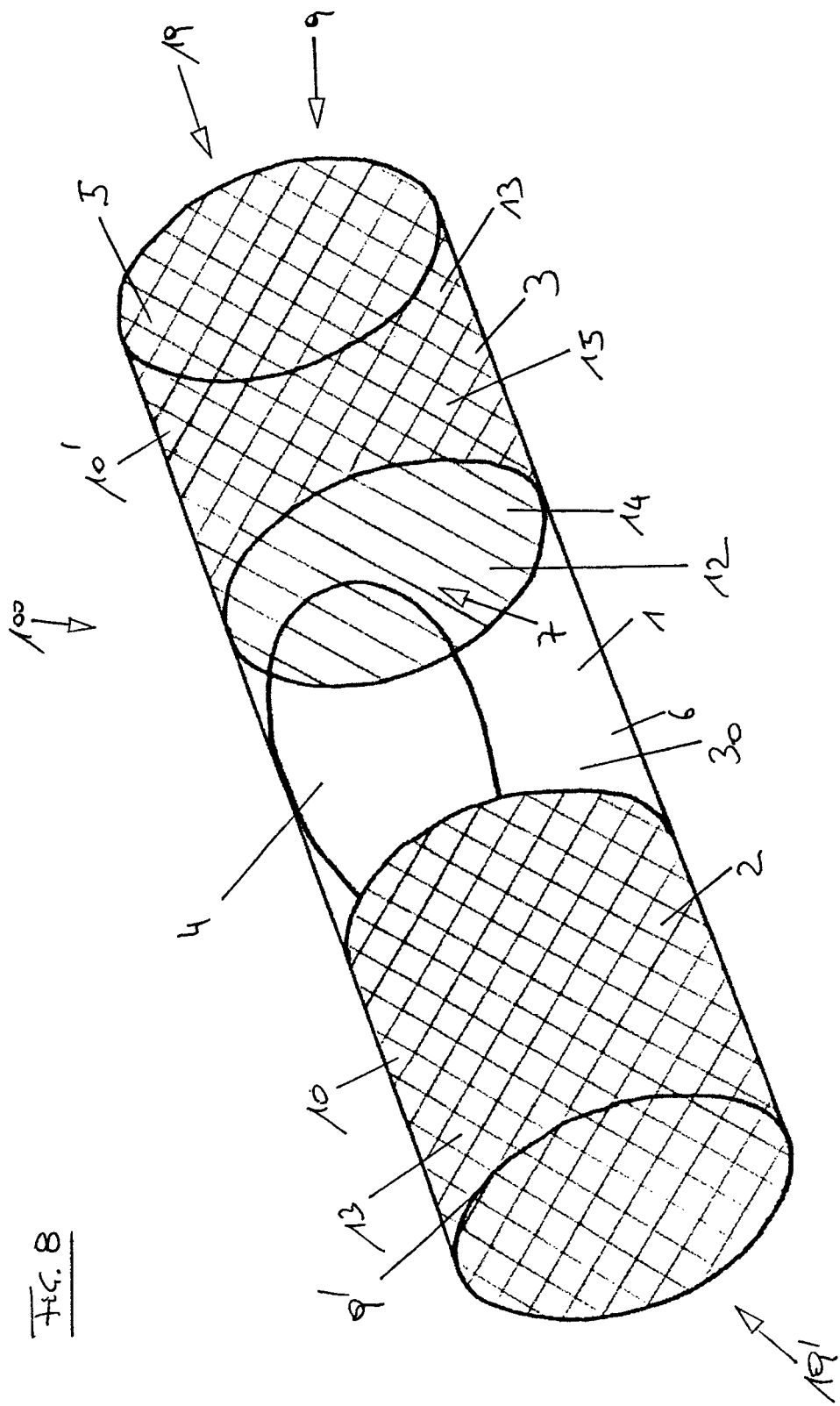
FIG. 8 shows a perspective view of a tube-type vial having two darkened regions.

FIG. 8 shows a vial 100, in this case a tube-type vial, with darkened regions 10 and 10' in the second region 2 and the third region 3 respectively of the tube-type vial 100. In the leveled condition the bubble 4 is once again in the first region 1. The description of the block vial 100 shown in FIG. 2 also applies in substance to this tube-type vial 100.

Figure 9:
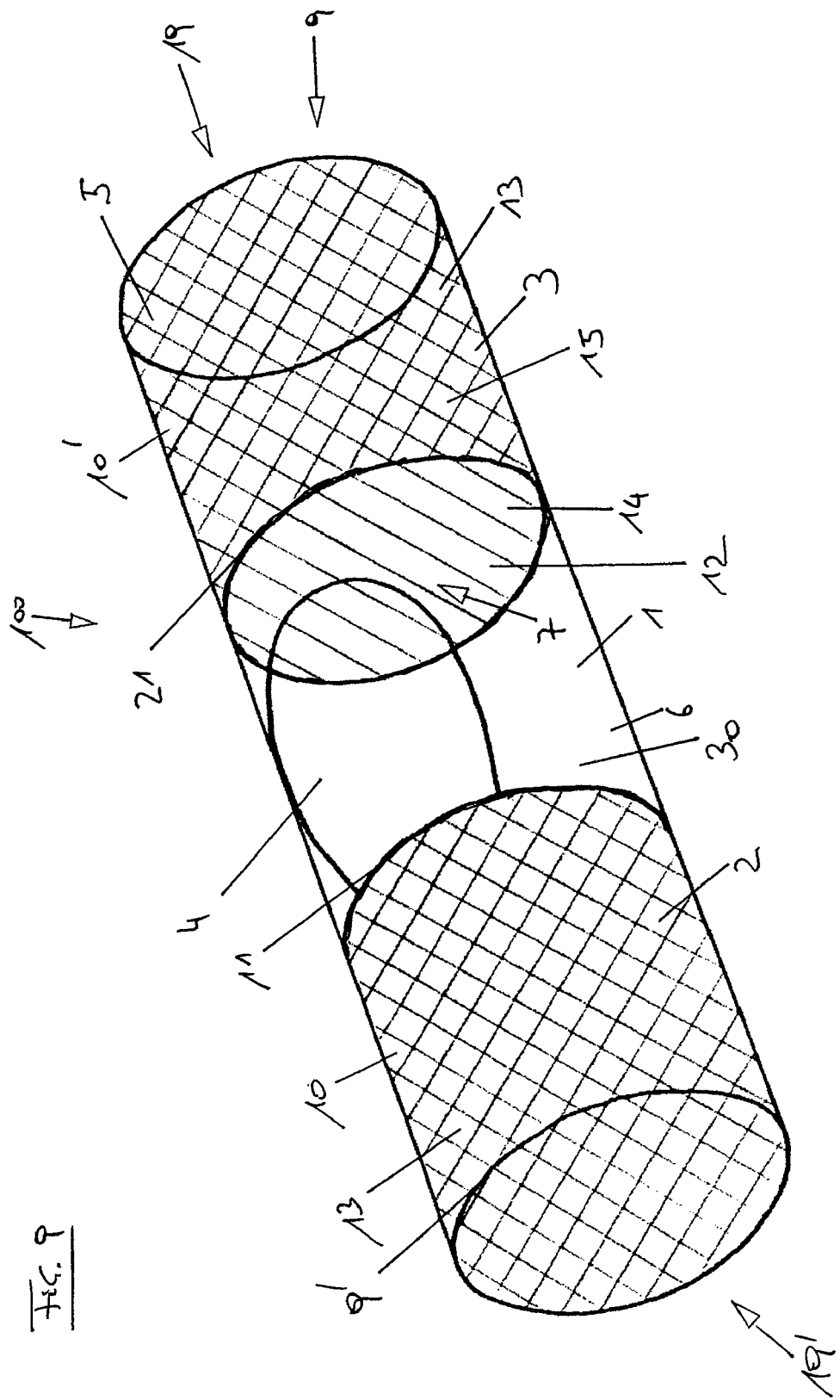
FIG. 9 shows a perspective view of a tube-type vial having two darkened regions and two marking rings.

FIG. 9 shows a tube-type vial 100, as shown in FIG. 8, with the sole difference that this further has two marking rings 11 and 21.

Figure 10:
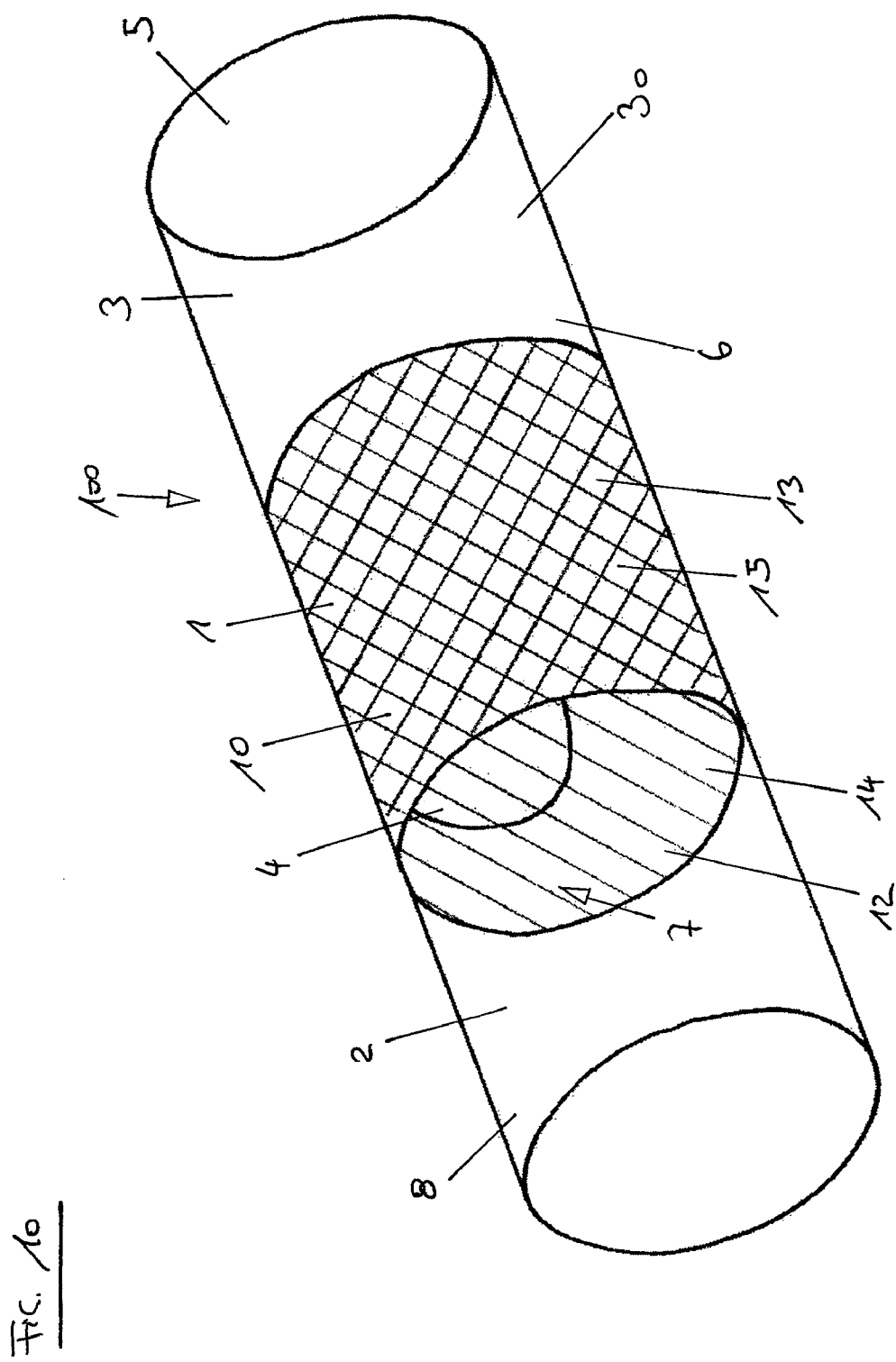
FIG. 10 shows a perspective view of a tube-type vial having a darkened region.

FIG. 10 shows a tube-type vial 100 in which the darkened region 10 is provided in the first region 1. Here too the description relating to the block vial 100 in FIG. 4 applies.

In this embodiment illustrated here the tube-type vial 100 does not have any marking rings. It will be appreciated that it would be equally possible for this tube-type vial 100 to be provided with marking rings at the transitions between the first region 1 to the second and third regions 2 and 3.

Figure 11:
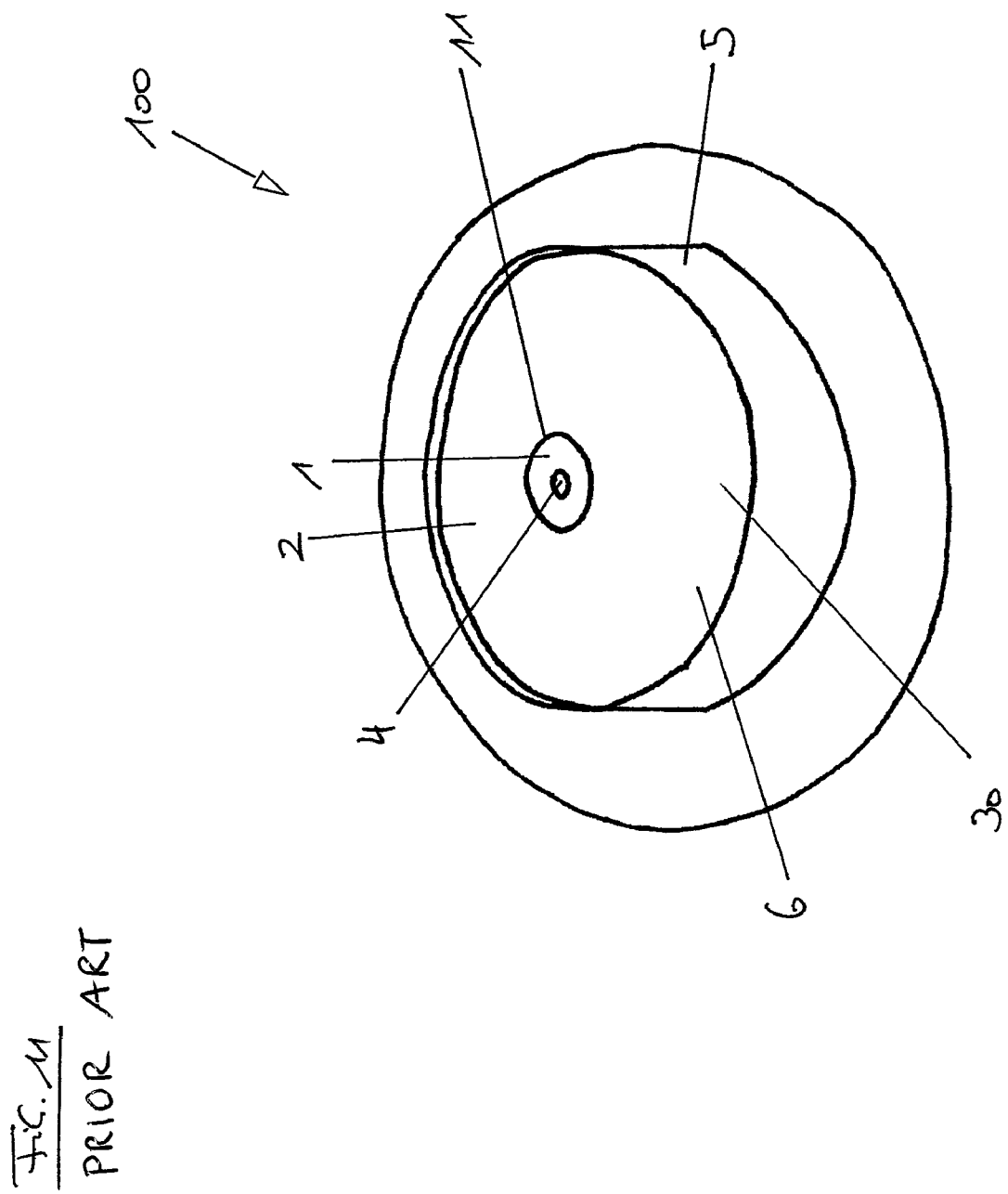
FIG. 11 shows a perspective view of a circular vial in accordance with the state of the art.

FIG. 11 shows a perspective view of a circular vial 100 in accordance with the state of the art. The circular vial 100 has a bubble 4, wherein the bubble 4 is disposed in a first region 1 when the vial 100 is in the leveled condition. The second region 2 is disposed outside the first region 1, the second region 2 directly adjoining the first region 1 and being of a width corresponding to at least a third and in particular half the width of the first region 1. In that respect the marking ring 11 is still further provided at the first region 1. The circular vial 100 has a body 5, wherein provided in the body 5 is a cavity 6 which is partially—except for the bubble 4—filled with the liquid 30.

Figure 12:
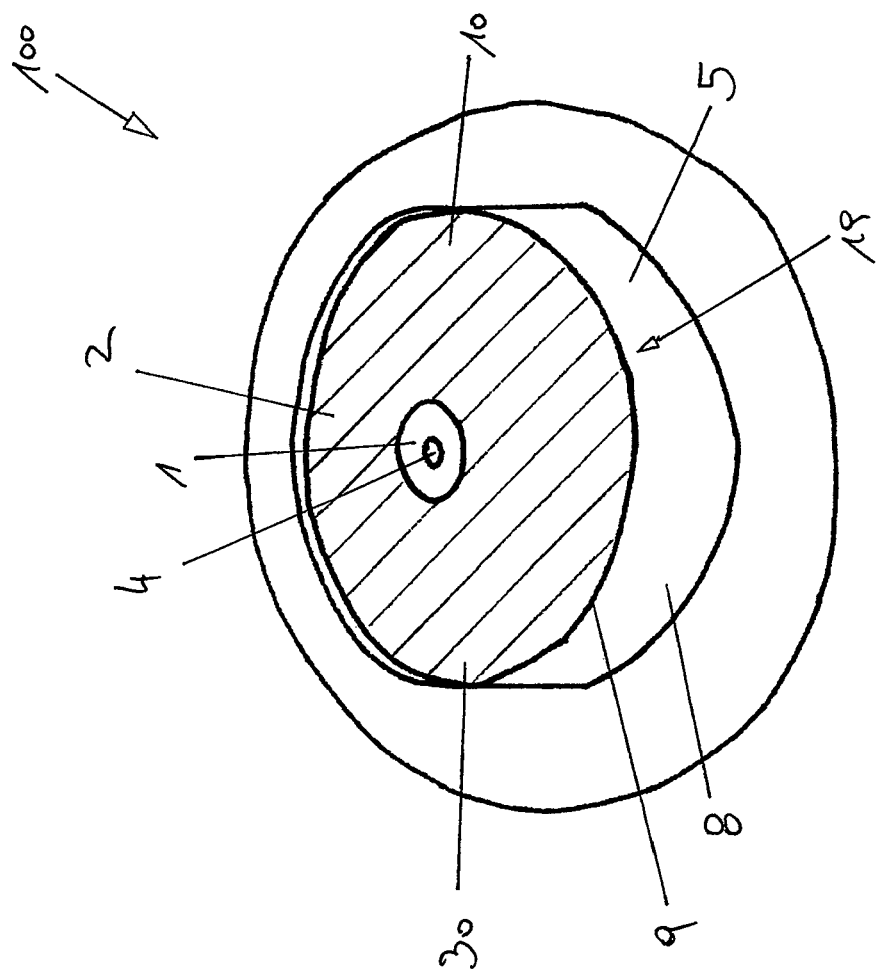
FIG. 12 shows a perspective view of a circular vial having a darkened region.

FIG. 12 shows a circular vial 100 having a bubble 4 and a first region 1, wherein the bubble 4 is in the first region 1 in the leveled condition of the vial 100, and a second region 2, wherein the second region 2 directly adjoins the first region 1 and is of a width corresponding to at least a quarter—in particular a third—of the width of the first region 1, wherein the second region 2 is darkened at 10 in this embodiment. It will be appreciated that the region 1 could also be in the form of a darkened region 10.

The second region 2 substantially completely surrounds the first region 1.

The description relating to FIG. 2 applies in substance per se to the configuration of the darkened region 10, with the difference that there is only one darkened region 10.

Figure 13:
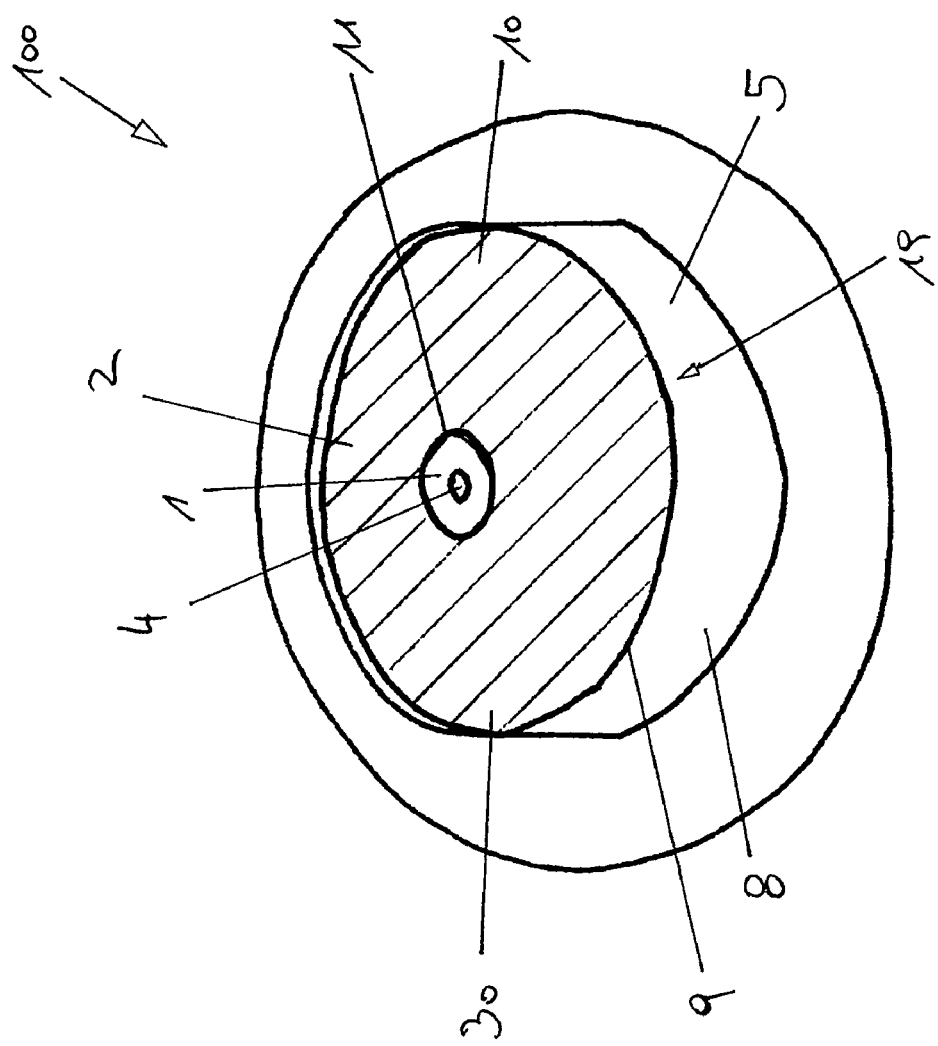
FIG. 13 shows a perspective view of a circular vial having a darkened region and a marking ring.

FIG. 13 shows a circular vial 100, as shown in FIG. 12, with the sole difference that the circular vial 100 in FIG. 13 has a marking ring 11.

Figure 14:
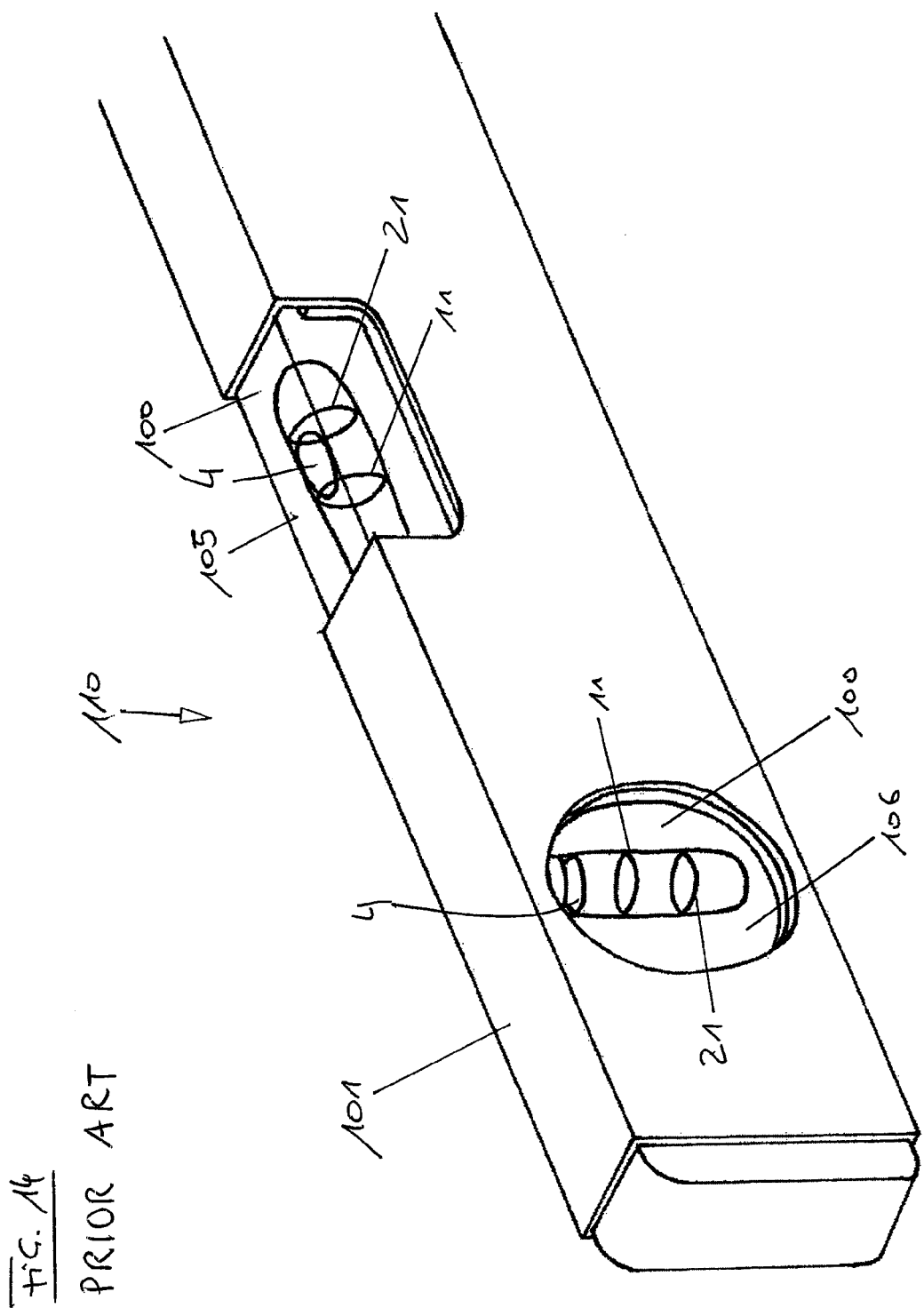
FIG. 14 shows a perspective view of a spirit level having two vials in accordance with the state of the art.

FIG. 14 shows a perspective view of a spirit level 110 in accordance with the state of the art. That spirit level 110 has a profile body 101 in which two vials 100 are arranged. In this case one vial 100 is in the form of a horizontal vial 105 and the second vial 100 is in the form of a vertical vial 106.

Figure 15:
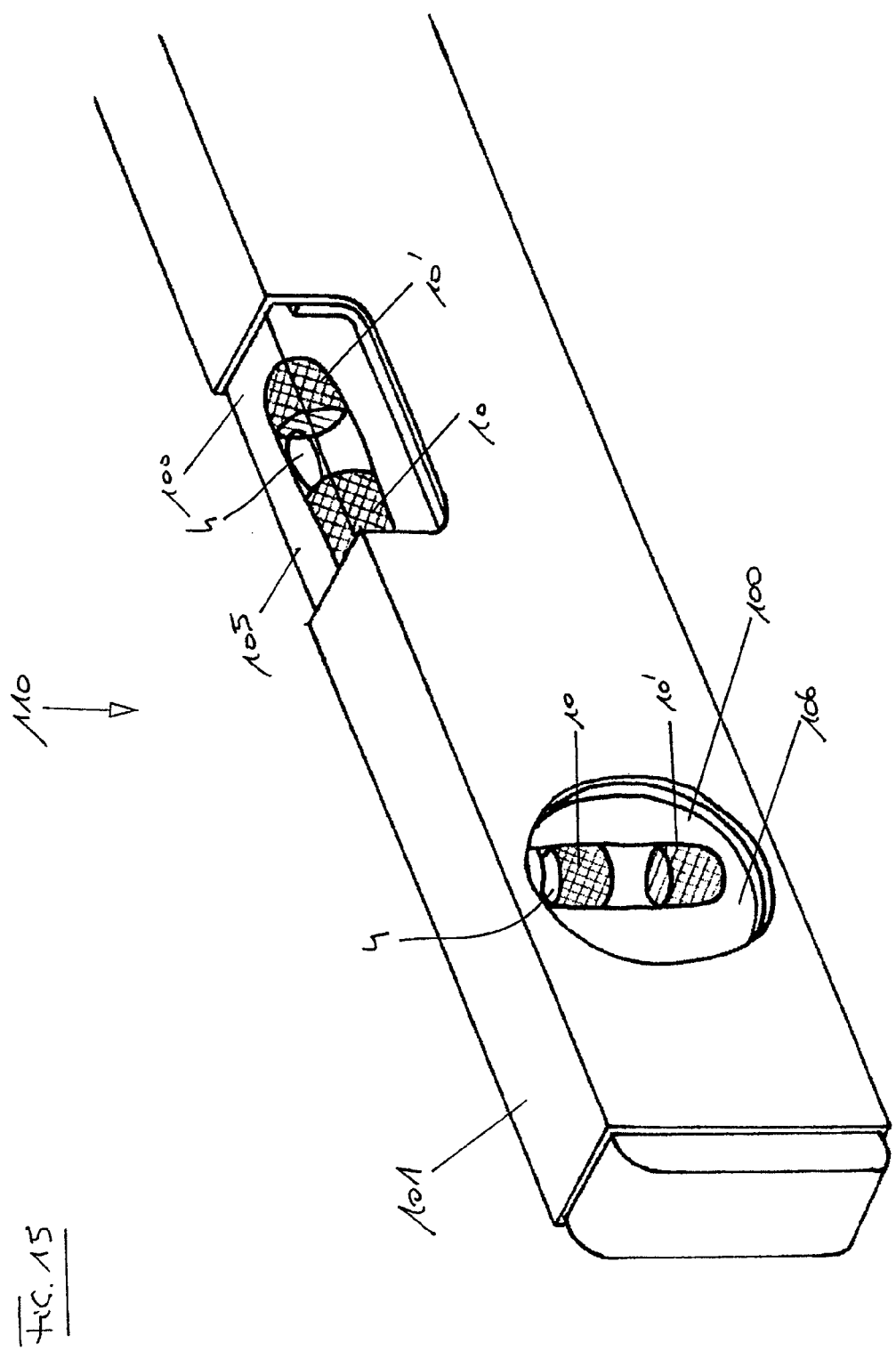
FIG. 15 shows a perspective view of a spirit level having two block vials each having two darkened regions.

FIG. 15 shows a spirit level 110 having a profile body 101 and vials 100 arranged in the profile body 101.

In this case once again one vial 100 is in the form of a vertical vial 106 and the second vial 100 is in the form of a horizontal vial 105. In this embodiment both vials 100 have darkened regions 10 and 10' (description of the vertical block vial—see the description relating to FIG. 6—and description of the horizontal block vial—see the description relating to FIG. 2).

Figure 16:
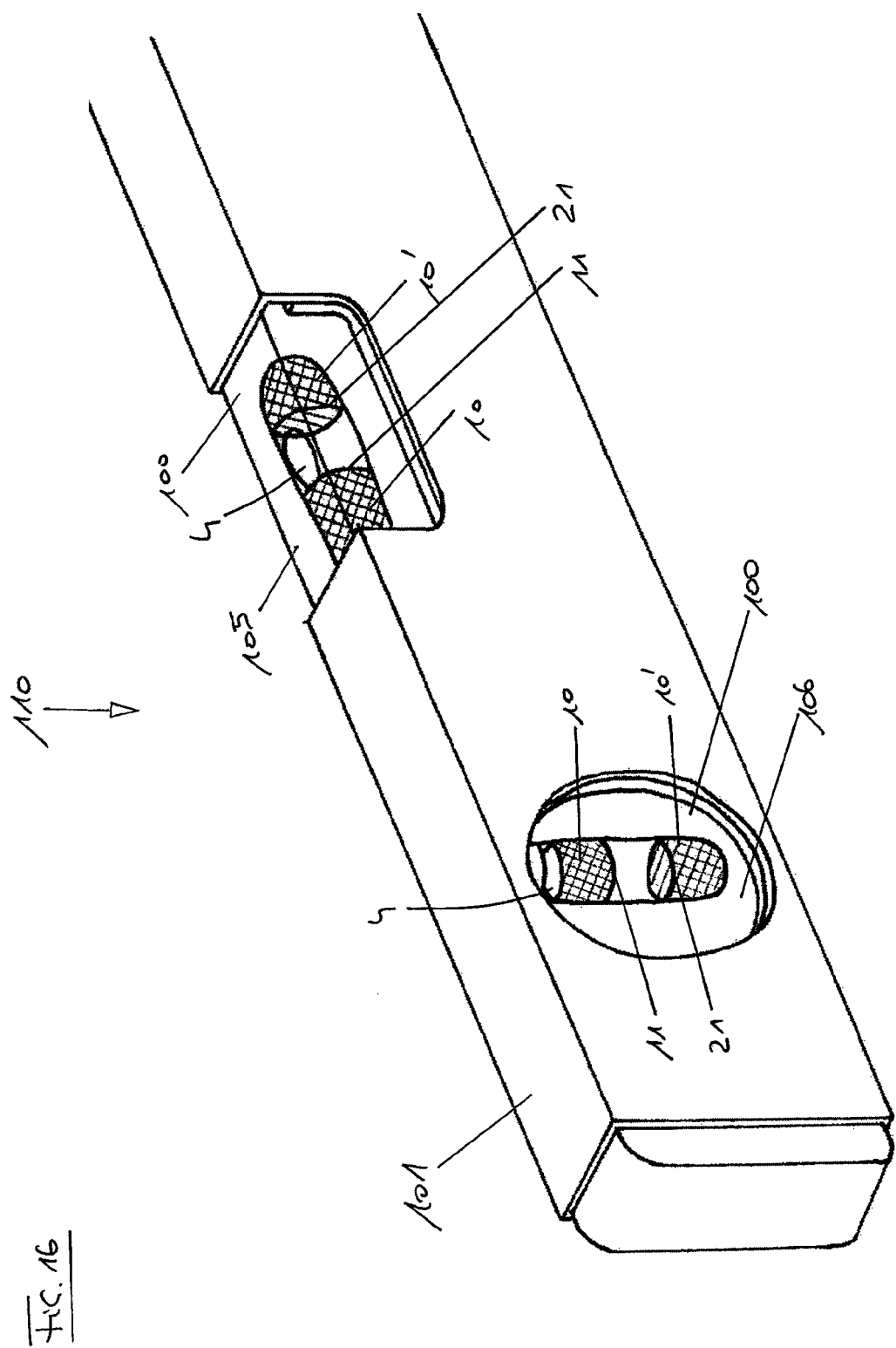
FIG. 16 shows a perspective view of a spirit level having two block vials each having two darkened regions and two marking rings.
Figure 17:
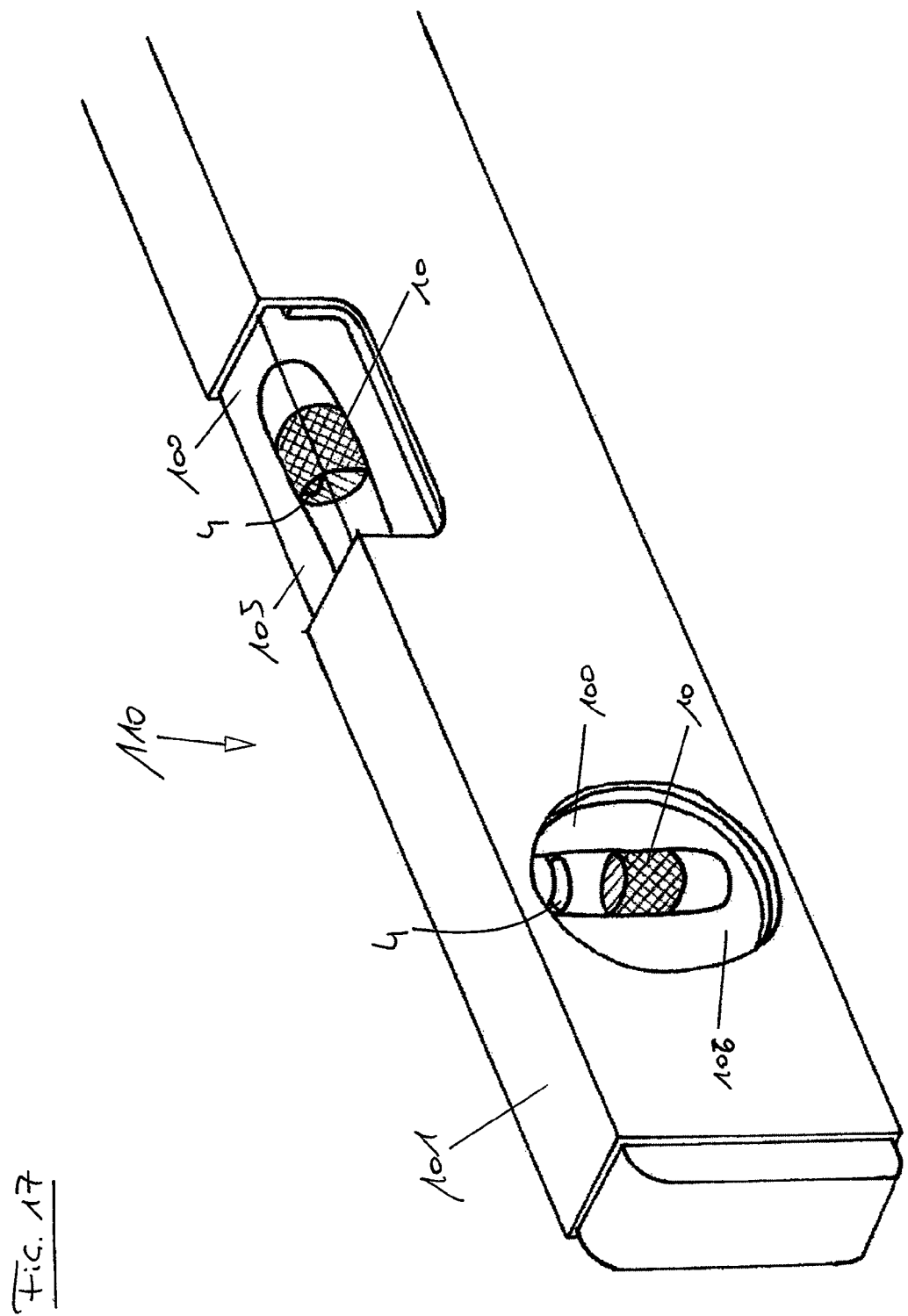
FIG. 17 shows a perspective view of a spirit level having two block vials each having a darkened region.

FIG. 16 shows a spirit level 110 as just described with reference to FIG. 15, with the sole difference that the vials 100 in this case have marking rings 11 and 21.

The invention claimed is:

1. A device comprising:
a vial for a spirit level, the vial having at least a first region and a second region, the second region directly adjoining the first region; and
a marker body in the vial, the marker body being configured such that when the vial is in a leveled condition, the marker body is disposed in the first region,
wherein one of the first and second regions is darkened, thereby causing the marker body to be partially visible when the vial is outside the leveled condition of the vial.

2. The device as set forth in claim 1, wherein the second region is of a width which is at least a quarter of the width of the first region.

3. The device as set forth in claim 1, wherein the darkened one of the first and second regions is translucent or partially light-transmissive.

4. The device as set forth in claim 1, wherein the second region substantially completely surrounds the first region.

5. The device as set forth in claim 1, wherein the vial has a third region, wherein the third region directly adjoins the first region and is of a width which is at least a quarter of the width of the first region.

6. The device as set forth in claim 1, wherein the vial does not have a marking ring.

7. The device as set forth in claim 1, wherein the vial has at least one marking ring.

8. The device as set forth in claim 5, wherein the second region is a darkened region or the second and the third regions are darkened regions.

9. The device as set forth in claim 1, wherein the vial has a body and a cavity in the body, and wherein the darkened one of the first and second regions is at least partially at the surface of the body in a direction towards the cavity.

10. The device as set forth in claim 1, wherein the darkened one of the first and second region is provided at least partially in the interior of the body.

11. The device as set forth in claim 1, wherein the darkened one of the first and second regions is at least partially at the outside surface of the body.

12. The device as set forth in claim 5, wherein the second region extends substantially to the end of the cavity or the second and the third regions extend substantially to the end of the cavity.

13. The device as set forth in claim 5, wherein the second region extends substantially to the end of the body or the second and the third regions extend substantially to the end of the body.

14. The device as set forth in claim 1, wherein the darkened one of the first and second regions is at least partially coloring coating material.

15. The device as set forth in claim 1, wherein the darkened one of the first and second regions has at least two different color regions.

16. The device as set forth in claim 15, wherein the two different color regions are mutually superposed first and second color layers at the surface of the body in a direction towards the cavity, wherein the first color layer is an inner layer and the second color layer is an outer layer.

17. The device as set forth in claim 1, wherein at least one of
the body of the vial,
a closure cover of the cavity,
a liquid in the cavity of the body, and
the marker body is at least partially fluorescent or phosphorescent.

18. The device as set forth in claim 1, wherein the vial is a block vial.

19. The device as set forth in claim 1, wherein the marker body is a bubble.

20. The device as set forth in claim 14, wherein the coloring coating material is ink, lacquer, plastic material, metal or a metal alloy.

21. A device comprising:
a vial for a spirit level, the vial having at least a first region, a second region and a third region, the second region directly adjoining the first region and the third region directly adjoining the first region; and
a marker body in the vial, the marker body being configured such that when the vial is in a leveled condition, the marker body is disposed in the first region,
wherein one or two of the first, second, and third regions is darkened, thereby causing the marker body to be partially visible when the vial is outside the leveled condition of the vial.

22. The device as set forth in claim 21, wherein the second region and the third region are of a width which is at least a quarter of the width of the first region.

23. The device as set forth in claim 21, wherein the darkened one or two of the first, second, and third regions is translucent or partially light-transmissive.

24. The device as set forth in claim 21, wherein the vial does not have a marking ring.

25. The device as set forth in claim 21, wherein the vial has at least one marking ring.

26. The device as set forth in claim 21, wherein the second and the third regions are darkened regions.

27. The device as set forth in claim 21, wherein the vial has a body and a cavity in the body, wherein the darkened one or two of the first, second, and third regions is at least partially at the surface of the body in a direction towards the cavity.

28. The device as set forth in claim 21, wherein the darkened one or two of the first, second, and third regions is at least partially the interior of the body.

29. The device as set forth in claim 21, wherein the darkened one or two of the first, second, and third regions is at least partially at the outside surface of the body.

30. The device as set forth in claim 21, wherein the second and the third regions extend substantially to the end of the cavity.

31. The device as set forth in claim 21, wherein the second and the third regions extend substantially to the end of the body.

32. The device as set forth in claim 21, wherein the darkened one or two of the first, second, and third regions is at least partially a coloring coating material.

33. The device as set forth in claim 21, wherein the darkened one or two of the first, second, and third regions has at least two different color regions.

34. The device as set forth in claim 33, wherein the two color regions are mutually superposed first and second color layers at the surface of the body in a direction towards the cavity, wherein the first color layer is an inner layer and the second color layer is an outer layer.

35. The device as set forth in claim 21, wherein at least one of
the body of the vial,
a closure cover of the cavity,
a liquid in the cavity of the body, and
the marker body is at least partially fluorescent or phosphorescent.

36. The device as set forth in claim 21, wherein the vial is a block vial.

37. The device as set forth in claim 21, wherein the marker body is a bubble.

38. The device as set forth in claim 32, wherein the coloring coating material is ink, lacquer, plastic material, metal or a metal alloy.

39. A spirit level with at least one vial as set forth in claim 1.

40. A spirit level having a profile body with at least one vial as set forth in claim 1.

41. A spirit level with at least one vial as set forth in claim 21.

42. A spirit level having a profile body with at least one vial as set forth in claim 21.

43. The device as set forth in claim 5, wherein the first region is disposed between the second region and the third region, the second region being the one of first and second the regions that is darkened, and the third region being darkened, the marker body being configured to be at least partially obscured by one of the second region and the third region when the vial is outside the leveled condition of the vial.

* * * * *